United States Patent

[11] 3,633,535

| [72] | Inventor | Louis M. Puster<br>Knoxville, Tenn. |
|---|---|---|
| [21] | Appl. No. | 853,877 |
| [22] | Filed | Aug. 28, 1969 |
| [45] | Patented | Jan. 11, 1972 |
| [73] | Assignee | Robertshaw Controls Company<br>Richmond, Va. |

[54] GAGE CONSTRUCTION AND LINK MEANS THEREFOR
20 Claims, 6 Drawing Figs.

[52] U.S. Cl. .................................................. 116/129 R,
73/414, 74/581
[51] Int. Cl. .................................................. G01d 11/00,
G01l 7/04
[50] Field of Search .................................... 116/129 R;
73/432 A, 414, 411; 74/89, 582, 581, 584

[56] References Cited
UNITED STATES PATENTS

| 2,346,422 | 4/1944 | Gess | 116/129 |
| 2,541,579 | 2/1951 | Fish | 74/89 |
| 2,701,968 | 1/1955 | Brown | 73/414 |
| 2,930,235 | 3/1960 | Oppenheim | 73/432 A X |
| 3,398,583 | 8/1968 | Heise et al. | 73/411 X |
| 3,452,600 | 1/1969 | Gray | 73/411 |
| 2,726,555 | 12/1955 | McGrath | 74/581 |
| 3,257,852 | 6/1966 | Perkins | 73/414 |

FOREIGN PATENTS

| 766,024 | 8/1967 | Canada | 73/414 |

*Primary Examiner*—Louis R. Prince
*Assistant Examiner*—Daniel M. Yasich
*Attorney*—Candor, Candor & Tassone

ABSTRACT: A double-acting spring link means for a pressure gage, the link means having a slot therein receiving a slide member adapted to be operated by the movable part of the actuating element of the gage while being slidable and pivotable in the slot. The link means has a spring means operatively associated with the slide member to normally cause the slide member and link means to move in unison to cause normal movements of the movable part of the actuating element to be directly transmitted to the indicating pointer of the gage, the spring means minimizing rapid movements of the movable part of the actuating element that would be adversely imposed on the gear train means and bearings of the gage by causing pivotal and sliding movement of the sliding member in the slot to take up the rapid movement of the movable part of the actuating element.

INVENTOR.
LOUIS M. PUSTER

BY

HIS ATTORNEYS

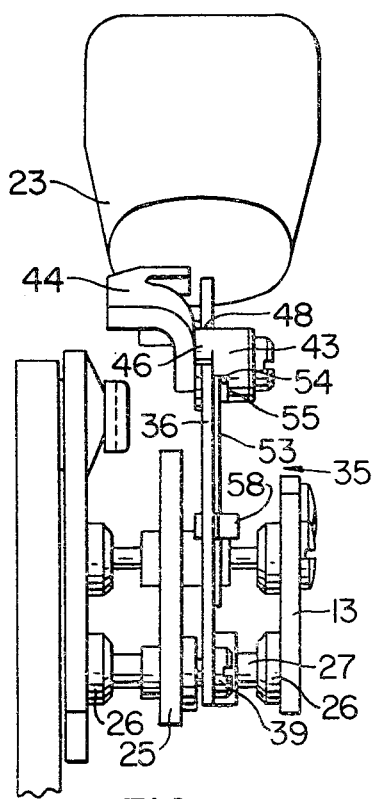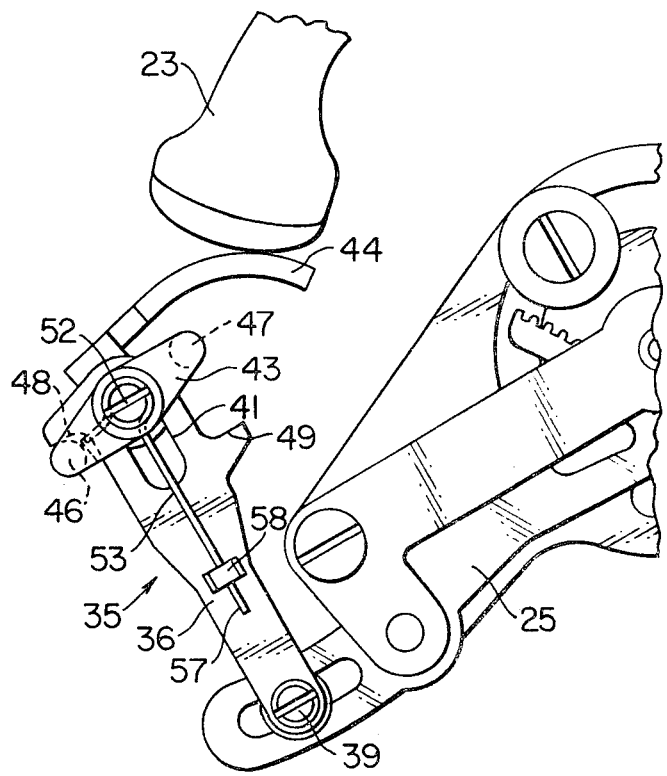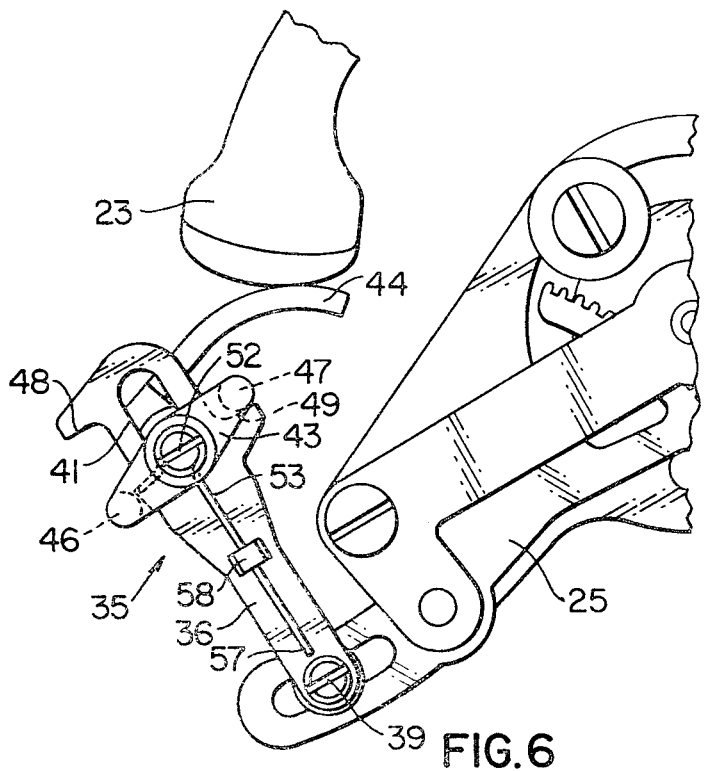

GAGE CONSTRUCTION AND LINK MEANS THEREFOR

An improved gage construction as well as improved link means for such a gage construction or the like.

It is well known that pressure gages and the like include an actuating element, such as a Bourdon tube, bellows assembly or other similar element, which has an end or tip that moves upon changes in pressure whereby the movement of the movable end of the actuating element is amplified by a suitable mechanical gear train or the like interconnected to a pointer carrying shaft so that the changes sensed by the actuating element can be visually determined by the location of the pointer relative to a suitable dial face.

However, such actuating elements involve the development of a relatively high order of energy change upon sudden application or release of pressure in the elastic chamber of the actuating element.

Gages not equipped with dampening means for this rapid release or application of pressure in the elastic chamber of the actuating element whip the pointer mechanism to such an extent that the pointer may be bent or dislodged from the pointer shaft.

Therefore, various manufacturers have utilized dampening means for dampening rapid movement of the pointer shaft.

For example, one such dampening means is fully disclosed in a U.S. Pat. to Brown, No. 2,701,968, wherein a viscous dampener is operatively interconnected to the pointer shaft to dampen rapid movement of the pointer shaft.

However, is has also been found that when gages utilize such dampening means, a tremendous loading is imposed upon the bearings of the mechanical gear train interposed between the movable end of the actuating element and then pointer shaft.

The U.S. Pat. to Perkins, No. 3,257,852, teaches the use of a resilient link provided between the movable end of the actuating element of such a gage and the mechanical gear train thereof to substantially eliminate any adverse effects on the bearing means or gear train of the gage construction during sudden application or release of pressure in the elastic chamber of the actuating element, the resilient link limiting the amount of force which may be transmitted from the movable end of the actuating element to the mechanical gear train upon rapid application or release of pressure in the elastic chamber of the actuating element.

Accordingly, one feature of this invention is to provide an improved link means of the above type to prevent rapid movements of the actuating element of the gage construction from imposing such force directly on the gear train means, bearings and pointer of the gage construction.

In particular, one embodiment of this invention provides a gage construction having a support means rotatably carrying a shaft that operates the indicating pointer, an actuating element being carried by the support means and having a movable part for operating the gear train means carried by the support means and being operatively interconnected to the pointer shaft to rotate the same. A link means is operatively associated with the movable part of the actuating element and with the gear train means so that the pointer will reflect normal movements of the movable part of the actuating element. The link means has a slot therein receiving a slide member operated by the movable part of the actuating element and being slidably and pivotally movable in the slot. A spring means is operatively associated with the slide member to normally cause the slide member and link means to move in unison. However, upon rapid movements of the movable part of the actuating element, the spring means causes pivotal and sliding movement of the slide member in the slot to take up the rapid movement of the movable part of the actuating element.

Accordingly, it is an object of this invention to provide an improved gage construction having one or more of the novel features set forth above or hereinafter shown or described.

Another object of this invention is to provide an improved link means having one or more of the novel features set forth above or hereinafter shown or described.

Other objects, uses and advantages of this invention are apparent from a reading of this description which proceeds with reference to the accompanying drawings forming a part thereof and wherein:

FIG. 4 is a side view of the structure of FIG. 3 and is taken substantially on line 4—4 thereof.

FIG. 5 is a view similar to FIG. 3 and illustrates the link means of this invention absorbing a rapid movement of the actuating element in one direction thereof.

FIG. 6 is a view similar to FIG. 5 and illustrates the link means of this invention absorbing a rapid movement of the actuating element in the other direction thereof.

Figure 1:
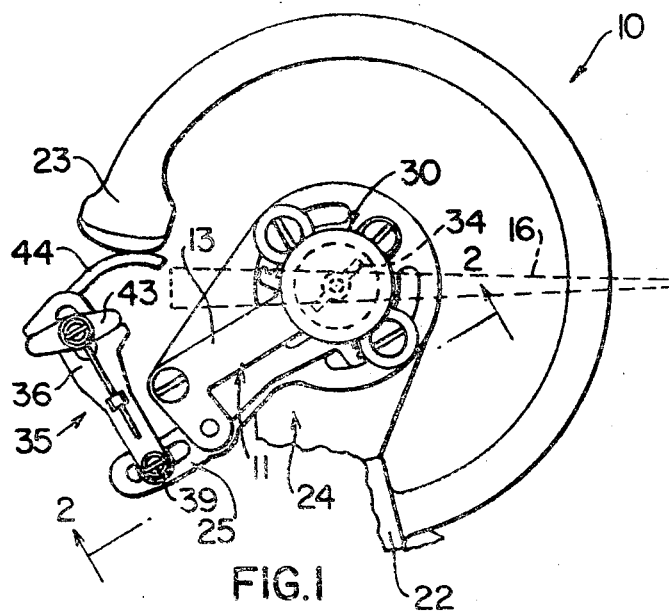
FIG. 1 is a schematic, broken away, rear view of the improved gage construction of this invention.

While the various features of this invention are hereinafter described and illustrated as providing link means particularly adaptable for a pressure gage construction, it is to be understood that the various features of this invention can be utilized singly or in any combination thereof to provide link means for other devices as desired.

Therefore, this invention is not to be limited to only the embodiment illustrated in the drawings, because the drawings are merely utilized to illustrate one of the wide variety of uses of this invention.

Figure 2:
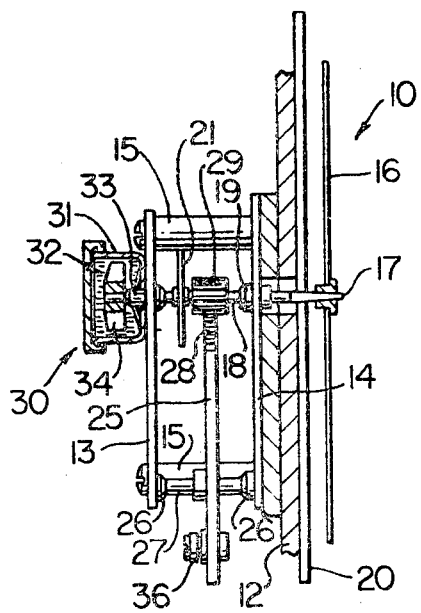
FIG. 2 is a fragmentary, broken away, partial cross-sectional view of the side of the gage construction taken substantially on line 2—2 of FIG. 1.

Referring now to FIGS. 1 and 2, the improved pressure gage construction of this invention is generally indicated by the reference numeral 10 and comprises a base or support means 11 secured to a Bourdon tube system 22 which, in turn, is secured in a gage housing 12 in any suitable manner, the support means 11 comprising a plurality of plates 13 and 14 suitably secured together in spaced relation by posts 15 or the like.

A pressure indicating pointer 16 is carried on the free end 17 of a shaft 18 journaled in suitable bearing means 19 carried by the support means 11 whereby the shaft 18 is adapted to be rotated relative to the support means 11 in response to pressure changes in a manner hereinafter described to move the pointer 16 relative to a dial face plate 20 to indicate a pressure reading, the shaft 18 normally being urged in a direction to indicate a zero pressure reading by a hair spring 21 in a manner well known in the art.

The actuating system or element 22, such as a Bourdon tube, carried the support means 11 and has a movable part or tip 23 which moves in response to changes in pressure sensed by the actuating element 22. This normal movement of the movable part 23 of the actuating element 22 is indicated by the pointer 16 being correspondingly moved relative to the dial face 20. In order to amplify the movement of the end 23 of the actuating element 22 to the pointer 16, a mechanical gear train, generally indicated by the reference numeral 24, is provided between the movable end 23 of the actuating element and the pointer shaft 18, such gear train or motion transmitting means 24 comprising a sector gear lever 25 fixed to a shaft 27 that is rotatably disposed between the base plates 13 and 14 in suitable bearing means 26 carried thereby.

The sector gear 25 has a gear teeth portion 28 disposed in meshing relation with a pinion gear 29 fixedly secured to the pointer shaft 18 whereby rocking movement of the lever 25 and its shaft 27 causes rotary motion of the pointer shaft 18.

As previously set forth, the movement of the end 23 of the actuating element 22 involves the development of a relatively high order of energy change upon a sudden application or release of pressure in the elastic chamber of the actuating element 22 whereby dampening means must be provided to prevent whipping of the pointer mechanism during the sudden application on release of pressure to prevent the pointer 16 from being bent or dislodged from the pointer shaft 18.

One such means is illustrated in FIGS. 1 and 2 and comprises a viscous dampener 30 operatively interconnected to the pointer shaft 18, the viscous dampener 30 comprising a housing 31 secured to the baseplate 13 and having a cavity 32 thereof filled with a viscous fluid. The pointer shaft 18 has an end 33 thereof projecting into the cavity 32 and attached to a paddle wheel 34 disposed in the viscous fluid. Therefore, the viscous fluid in the chamber 32 acts to prevent rapid rotational movement of the paddle wheel 34 and, thus, rapid movement of the pointer shaft 18 during rapid movement of the end 23 of the actuating element 22.

However, as previously set forth, it has been found that in mechanical gear trains, such as the gear train 24, the gear teeth thereof are subjected to a considerably mechanical loading by virtue of mechanical multiplication of the gear train and the accelerations imposed by the movable end 23 of the actuating element 22 when subjected to sudden increases or decreases in pressure. From experience, it has been found that this loading is severe enough to rapidly wear out the bearings of the gage 10 and permanently distort the gear train 24 as well as to sometimes dislodge the gear train mounting from the support means 11 of the gage construction 10.

This invention eliminates such disadvantages by providing a resilient link means 35 between the movable end 23 of the actuating element 22 and the gear train 24.

Figure 3:
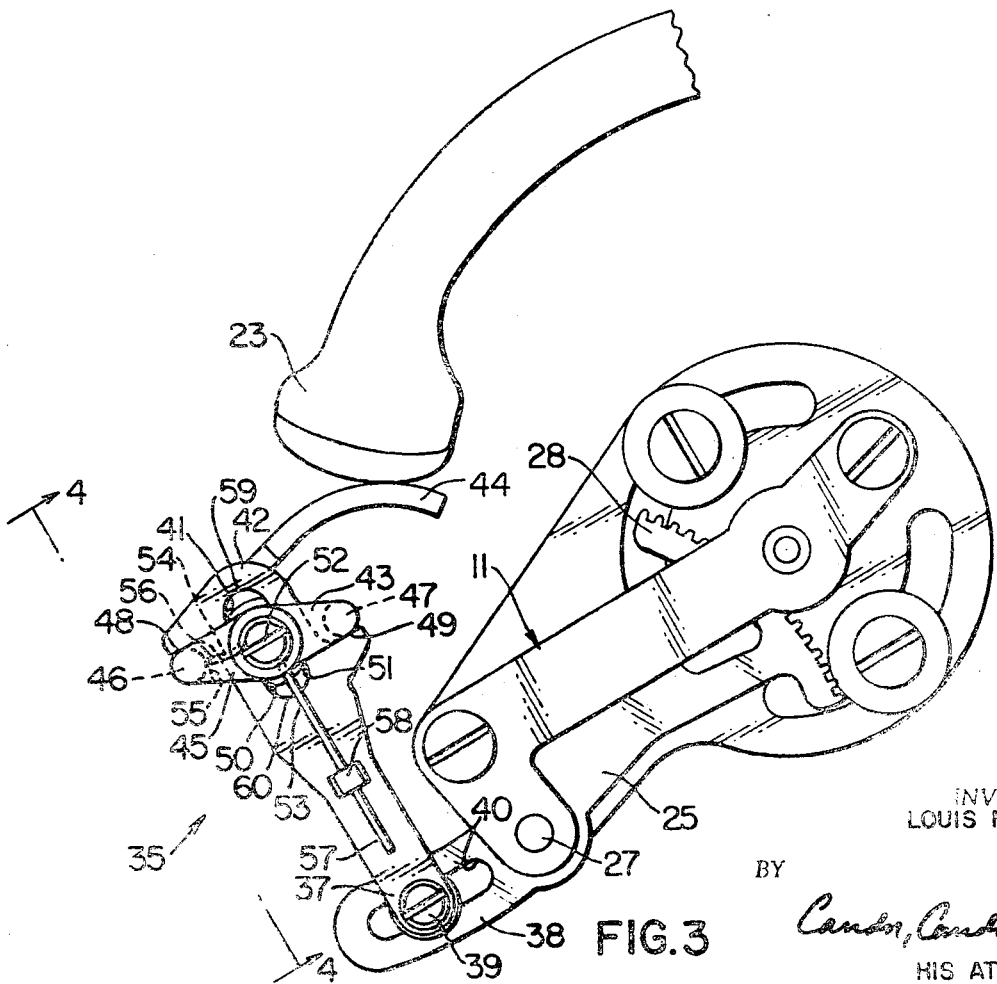
FIG. 3 is a fragmentary, enlarged view of the gage construction of FIG. 1 with the viscous dampener thereof removed.

As illustrated in FIGS. 1 and 3, the resilient link means 35 comprises a link member 36 having one end 37 adapted to be adjustably secured to the lower end 38 of the sector gear lever 25 by a threaded pivot member 39 disposed in a slot 40 formed in the end 38 of the sector gear lever 25 with the threaded pivot member 39 being fixed in a desired position along the slot 40 upon the tightening of a nut thereof so that the link member 36 is fastened directly to the sector gear lever 25 without any translatory movement therebetween.

The link member 36 has an elongated slot 41 formed in the other end 42 thereof with the slot 41 having its longitudinal axis radially disposed from the center of the fastening member 39. A slide member 43 has a portion thereof passing through the slot 41 of the link member 36 and is interconnected to an arcuate arm or tip 44 of the actuating element 22 adjacent one side of the link member 36, the tip 44 being secured to the end 23 of the actuating element 22 by welding, silver brazing, or the like. The slide member 43 has a platelike portion 45 disposed on the other side of the link member 36 from the tip 44 and carries two cylindrical abutment means 46 and 47 projecting rearwardly toward the tip 44 to respectively cooperate with outwardly directed abutments or shoulder means 48 and 49 of the link member 36 in a manner hereinafter described. The portion of the slide member 43 that projects through the slot 41 of the link member 36 slightly engages the opposed sides 50 and 51 of the slot 41 so as to maintain positive alignment of the central axis of the slide member 43 along the longitudinal axis of the slot 41 even though the slide member 43 can slide and pivot in the slot 41 as will be apparent hereinafter. A shouldered tip screw 52 passes through the slide member 43 and is threadedly connected to the tip 44 whereby the slide member 43 is adapted to rotate around the shoulder portion of the screw 52 and move in unison with the tip 44.

The link means 35 also includes a torsion spring 53 wound around the central portion of the slide member 43 and having one end 54 disposed in a cutout 55 of the plate portion 45 of the slide member 43 so as to bear against a shoulder means 56 thereof as illustrated in FIG. 3. The other end 57 of the torsion spring 53 extends along the center line of the link member 36 and projects through a guide member 58 carried by the link member 36 so as to permit the end 57 of the torsion spring 53 to slide up and down on the link member 36 along the longitudinal center line thereof as will be apparent hereinafter.

As illustrated in FIG. 3, with the opposed ends 54 and 57 of the torsion spring 53 being so restrained by the shoulder means 56 of the slide member 43 and by the guide member 58 of the link member 36, the torsion spring 53 normally tends to rotate the slide member 43 about its axis on the screw 52 in the slot 41 of the link member 36 so that the abutment means 46 and 47 thereof are respectively disposed against the abutment means 48 and 49 of the link member 36 with the slide member 43 being disposed intermediate the opposed ends 59 and 60 of the slot 41 in the link member 36 as illustrated in FIG. 3.

From the above description, it can be seen that the link means 35 of this invention can be formed of relatively few parts so as to be economical in the manufacture thereof to provide the aforementioned features during the operation thereof now to be described.

As previously stated, the slide member 43 is normally maintained in the position illustrated in FIG. 3 by the torsion spring 53 so that normal movement of the movable part 23 of the actuating element 22 of the gage construction 10 will be directly transmitted by the link means 35 to the sector gear 25 and, thus, to the pointer 16 to immediately reflect such normal movement of the movable part 23 of the actuating element 22.

In particular, normal release of pressure in the actuating element 22 causes the movable part 23 thereof to move downwardly in FIG. 3 and since the force of the torsion spring 53 during such normal movement of the movable part 23 of the actuating element 22 is greater than the force of the hairspring 21, the slide member 43 remains with its abutments 46 and 47 respectively in contact with the abutments 48 and 49 of the link member 36 to cause movement of the link member 36 directly therewith in a downward direction in FIG. 3 to move the sector gear lever 25 and its shaft 27 in a counterclockwise direction. Conversely, normal movement of the movable part 23 of the actuating element 22 in an upward direction upon an increase in pressure sensed will cause the hairspring 21 to move the link 36 and slide member 43 in its center position of FIG. 3 in unison therewith so as to reflect direct movement of the movable part 23 to the pointer 16.

However, rapid movement of the movable part 23 of the actuating element 22 in an up direction upon an increase in pressure in the actuating element 22 moves the tip 44 and the slide member 43 away from the fixed pivot point 39. With pivot point 39 fixed, upward movement of pivot point 52 of the slide member 43 causes the abutment means 46 of the slide member 43 to maintain sliding contact with abutment means 48 of the link member 36 and the abutment means 47 of the slide member 43 to move away from the abutment means 47 of the link member 36 whereby the slide member rotates in counterclockwise direction as illustrated in FIG. 5 because the part of the slide member 43 in the slot 41 of the link 36 is closely retained by the sides 50 and 51. Thus, as the abutment 47 of the slide member 43 moves away from the abutment 49 of the link member 36 by the rapid movement upward of the movable part 23 of the actuating element 22 in opposition to the force of the torsion spring 53, the hairspring 21 cannot cause the sector gear 25 to rapidly rotate in a clockwise direction to reflect such rapid movement of the end 23 of the actuating element 22.

Conversely, a rapid release of pressure sensed by the actuating element 22 of the gage construction 10 will cause the movable part 23 thereof to rapidly move downwardly as illustrated in FIG. 6. Such rapid movement being imposed the arm 44 to the slide member 43 causes the slide member 43 to slide downwardly and pivot in the slot 41 of the link member 36 so that the abutment 46 of the slide member 43 is moved away from the abutment 48 of the link member 36 while the abutment 47 of the slide member 43 slides in contact with the abutment 49 of the link 36 whereby the slide member 43 rotates in a counterclockwise direction in opposition to the force of the torsion spring 53. In this manner, the slide member 43 and torsion spring 53 absorbs the rapid movement of the movable part 23 of the actuating element 22 so that the same is not directly transmitted by the line member 36 to the sector gear lever 25.

Of course, should the actuating end 23 of the actuating element 22 remain in its up or down position of FIG. 5 or FIG. 6 after the aforementioned rapid movement thereof, the hairspring 21 and torsion spring 53 will subsequently cause the slide member 43 and link member 36 to again assume the condition illustrated in FIG. 3 so that the sector gear 25 and, thus, pointer 16 will subsequently indicate the new position of the movable part 23 of the actuating element 22.

Therefore, it can be seen that the link means 35 of this invention will prevent rapid movements of the movable part 23 of the actuating element 22 from being directly imposed on the sector gear lever 25 because such movements are taken up by the slide member 43 sliding and pivoting in the slot 41 of the link member 36 whereby the aforementioned adverse forces are not imposed upon the bearings or mechanical gear train of the gage construction 10.

Further, it can be seen that the link means 35 of this invention provides for positive positioning of the pivot points 52 and 30 thereof since the end 57 of the torsion spring 53 slides along the center line between the pivot points 52 and 39 whereby any wear of the parts of the link means 36 will be automatically compensated for with zero lost motion. Also, linear loading on the pivots of the link means 36 is eliminated. In addition, the position of the stops or abutments 46, 47, 48 and 49 can be changed in order to achieve some characterization of movement versus spring loading, if desired.

Thus, not only does this invention provide an improved gage construction, but also this invention provides improved link means for such a gage construction or the like.

What is claimed is:

1. A gage construction comprising support means, a shaft rotatably mounted to said support means and carrying an indicating pointer, an actuating element carried by said support means and having a movable part, gear train means carried by said support means and being operatively interconnected to said shaft to rotate the same, and link means operatively associated with said movable part of said actuating element and with said gear train means so that said pointer will reflect normal movements of said movable part of said actuating element, said link means having a slot therein provided with a longitudinal axis, said link means having a slide member engaged by said movable part of said actuating element so as to be moved by movement of said movable part and being disposed in said slot while being slidable and pivotable therein, said link means having spring means operably associated with said slide member to minimize rapid movements of said movable part of said actuating element that would be adversely imposed on said gear train means by causing pivotal and sliding movement of said slide member in said slot to take up said rapid movement of said movable part of said actuating element, said slide member having means for pivoting said slide member in said slot about axis means separate and spaced from the path of movement of said movable part of said actuating element and separate and spaced from said longitudinal axis of said slot during said rapid movement thereof.

2. A gage construction as set forth in claim 1 wherein said link means has abutment means, said slide member having abutment means that comprises said means for pivoting said slide member, said spring means normally maintaining said abutment means of said slide member in engagement with said abutment means of said link means so that normal direct movement of said movable part of said actuating element is transmitted by said slide member to said link means.

3. A gage construction as set forth in claim 2 wherein rapid movement of said movable part of said actuating element causes said slide member to pivot on said abutment means and thereby pivot and slide in said slot without immediately transmitting such slide member movement to said link means.

4. A gage construction as set forth in claim 1 wherein said spring means comprises a torsion spring that tends to pivot said slide member in one direction.

5. A gage construction as set forth in claim 4 wherein said torsion spring has one end bearing against said slide member and another end bearing against said link means.

6. A gage construction as set forth in claim 5 wherein said other end of said torsion spring is slidable relative to said link means.

7. A gage construction as set forth in claim 1 wherein said slide member is rotatably carried by said movable part of said actuating element.

8. A gage construction as set forth in claim 1 wherein said link means has an end secured to said gear train means, said slot having a center line radially disposed from said secured end of said link means.

9. A link means for transmitting motion of a movable part to a movable device that is adapted to be secured to said link means, said link means having a slot therein provided with a longitudinal axis, said link means having a slide member adapted to be engaged by said movable part so as to be moved by movement of said movable part and being disposed in said slot while being slidable and pivotable therein, said link means having spring means operatively associated with said slide member to normally maintain said slide member in one position in said slot so that normal movement of said movable part will be directly transmitted by said link means to said movable device, said spring means being adapted to minimize rapid movements of said movable part by causing pivotal and sliding movement of said slide member in said slot to take up said rapid movement so that the same will not immediately be transmitted to said movable device, said slide member having means for pivoting said slide member in said slot about axis means separate and spaced from the path of movement of said movable part of said actuating element and separate and spaced from said longitudinal axis of said slot during said rapid movement thereof.

10. A link means as set forth in claim 9 wherein said link means has abutment means, said slide member having abutment means that comprises said means for pivoting said slide member, said spring means normally maintaining said abutment means of said slide member in engagement with said abutment means of said link means so that said normal direct movement of said movable part will be transmitted by said slide member to said link means and, thus, to said movable device.

11. A link means as set forth in claim 10 wherein rapid movement of said movable part of said actuating element will cause said slide member to pivot on said abutment means and thereby pivot and slide in said slot without immediately transmitting such slide member movement to said link means.

12. A link means as set forth in claim 9 wherein said spring means comprises a torsion spring that tends to pivot said slide member in one direction.

13. A link means as set forth in claim 12 wherein said torsion spring has one end bearing against said slide member and another end bearing against said link means.

14. A link means as set forth in claim 13 wherein said other end of said torsion spring is slidable relative to said link means.

15. A link means as set forth in claim 9 wherein said slide member is adapted to be rotatably carried by said movable part of said actuating element.

16. A link means as set forth in claim 9 wherein said slot has a center line radially disposed from the part of said link means that is adapted to be secured to said movable device.

17. A gage construction comprising support means, a shaft rotatably mounted to said support means and carrying an indicating pointer, an actuating element carried by said support means and having a movable part, gear train means carried by said support means and being operatively interconnected to said shaft to rotate the same, and link means operatively associated with said movable part of said actuating element and with said gear train means so that said pointer will reflect normal movements of said movable part of said actuating element, said link means having a slot therein, said link means having a slide member engaged by said movable part of said actuating element so as to be moved by movement of said movable part and being disposed in said slot while being slidable and pivotable therein, said link means having spring means operatively associated with said slide member to minimize rapid movements of said movable part of said actuating element that would be adversely imposed on said gear train means by causing pivotal and sliding movement of said slide member in said slot to take up said rapid movement of said movable part of said actuating element, said link means having two separate and spaced-apart abutments facing in opposite directions, said slide member having two separate and spaced-apart abutments facing in opposite directions, said spring means normally maintaining said abutments of said slide member respectively in engagement with said abutments of said link means so that normal direct movement of said movable part of said actuating element is transmitted by said slide member to said link means, said spring means causing one of said abutments of said slide member to pivot on its respective abutment of said link means while the other abutment of said slide member moves away from its respective abutment of said link means and thereby pivot and slide in said slot without immediately transmitting such slide member movement to said link means during said rapid movement of said movable part of said actuating element in one direction.

18. A gage construction as set forth in claim 17 wherein said other abutment of said slide member pivots on its respective abutment of said link means while said one abutment thereof moves away from its respective abutment of said link means when said movable part of said actuating element rapidly moves in the opposite direction.

19. A link means for transmitting motion of a movable part to a movable device that is adapted to be secured to said link means, said link means having a slot therein, said link means having a slide member adapted to be engaged by said movable part so as to be moved by movement of said movable part and being disposed in said slot while being slidable and pivotable therein, said link means having spring means operatively associated with said slide member to normally maintain said slide member in one position in said slot so that normal movement of said movable part will be directly transmitted by said link means to said movable device, said spring means being adapted to minimize rapid movements of said movable part by causing pivotal and sliding movement of said slide member in said slot to take up said rapid movement so that the same will not immediately be transmitted to said movable device, said link means having two separate and spaced apart abutments facing in opposite directions, said slide member having two separate and spaced apart abutments facing in opposite directions, said spring means normally maintaining said abutments of said slide member respectively in engagement with said abutments of said link means so that normal movement of said movable part of said actuating element would be transmitted by said slide member to said link means, said spring means being adapted to cause one of said abutments of said slide member to pivot on its respective abutment of said link means while the other abutment of said slide member moves away from its respective abutment of said link means and thereby pivot and slide in said slot without immediately transmitting said slide member movement to said link means during rapid movement of said movable part of said actuating element.

20. A link means as set forth in claim 19 wherein said other abutment of said slide member is adapted to pivot on its respective abutment of said link means while said one abutment thereof moves away from its respective abutment of said link means when said movable part of said actuating element moves in the opposite direction.

* * * * *